US012717896B2

(12) United States Patent
Chai et al.

(10) Patent No.: US 12,717,896 B2
(45) Date of Patent: Aug. 25, 2026

(54) SYSTEM AND METHOD FOR SECURING A NEURAL NETWORK RUNTIME ENGINE

(71) Applicant: Latent AI, Inc., Menlo Park, CA (US)

(72) Inventors: Sek Meng Chai, Princeton, NJ (US); Jonathan D. Brookshire, Princeton, NJ (US); Abelardo Lopez-Lagunas, Princeton, NJ (US)

(73) Assignee: LATENT AI, INC., Menlo Park, CA (US)

( * ) Notice: Subject to any disclaimer, the term of this patent is extended or adjusted under 35 U.S.C. 154(b) by 237 days.

(21) Appl. No.: 18/453,842

(22) Filed: Aug. 22, 2023

(65) Prior Publication Data

US 2024/0070266 A1 Feb. 29, 2024

Related U.S. Application Data

(60) Provisional application No. 63/400,195, filed on Aug. 23, 2022.

(51) Int. Cl.
*G06F 21/54* (2013.01)
*G06F 21/60* (2013.01)

(52) U.S. Cl.
CPC ............ *G06F 21/54* (2013.01); *G06F 21/602* (2013.01); *G06F 2221/033* (2013.01)

(58) Field of Classification Search
CPC .. G06F 21/54; G06F 21/602; G06F 2221/033; G06F 21/577; G06F 2221/034; G06F 21/50; G06F 11/3668; G06F 11/3698; G06F 21/566; G06F 21/53; G06F 11/3466; G06F 21/52; G06F 9/4484; G06F 21/563; G06F 11/3612; G06N 3/02; G06N 20/00; G06N 5/04; G06N 3/09; H04L 63/1433; H04L 63/1483; H04L 2209/608; H04L 63/1416; H04L 63/1441; H04L 63/145; H04L 63/1425
See application file for complete search history.

(56) References Cited

U.S. PATENT DOCUMENTS

| | | | | |
|---|---|---|---|---|
| 10,686,834 | B1 * | 6/2020 | Hitchcock | G06N 20/00 |
| 11,120,364 | B1 * | 9/2021 | Gokalp | G06N 20/00 |
| 11,561,833 | B1 * | 1/2023 | Heaton | G06F 9/45504 |
| 2018/0144754 | A1 * | 5/2018 | Peng | H04N 21/8358 |
| 2019/0050564 | A1 * | 2/2019 | Pogorelik | G06F 21/53 |
| 2020/0218962 | A1 * | 7/2020 | Lee | G06N 3/0442 |
| 2021/0182685 | A1 * | 6/2021 | Xiao | G06N 3/045 |
| 2021/0241108 | A1 * | 8/2021 | Chai | H04L 41/16 |
| 2023/0121374 | A1 * | 4/2023 | Yang | G06N 3/084 706/25 |
| 2023/0134392 | A1 * | 5/2023 | D'Alessandro | G06Q 20/22 705/39 |
| 2024/0020788 | A1 * | 1/2024 | Luo | G06T 1/0085 |

* cited by examiner

*Primary Examiner* — Wasika Nipa
*Assistant Examiner* — Edgar W Xie
(74) *Attorney, Agent, or Firm* — Heath M. Sargeant; Holland & Knight LLP

(57) ABSTRACT

A system, apparatus and method are provided for securing a neural network (or other artificial intelligence model) against malicious activity, such as piracy, theft of intellectual property, sabotage, etc. One or more security elements or features (e.g., digital watermarks, encryption, obfuscation) are applied to the neural network model during training and/or optimization. Therefore, the model is enhanced with robust security before it is linked or merged with application software for performing inference processing using the model.

16 Claims, 7 Drawing Sheets

| | Authenticity/ Integrity 502 | Confidentiality 504 | Availability 506 |
|---|---|---|---|
| Description | Verify consistency and trustworthiness | Authorize use, determine ownership, and prevent IP loss | Ensure availability of inference processing operations |
| Runtime Services | Provide assurances that model has not changed and is the expected model | Check model integrity and allow inference operations only with proper permissions | Detect degraded performance of the model |
| Cyber Objectives | **Defend**: Provide bitwise guarantees regarding equivalence of models | **Defend**: Detect model similarity despite bitwise changes; **Attack**: Degrade or prevent inference when a user fails to provide proper key(s) | **Influence**: Monitor inference speed and accuracy to confirm proper operation; **Operate**: Send operation reports to analysts for mitigation |
| Example Use Cases | Detect changes by a bad actor; Detect corruption; Confirm use of correct model | Detect that model is derived from a particular source (despite fine-tuning, scaling, noise, etc.); Discourage model theft; Increase difficulty of reverse engineering | Check for model drift (e.g., due to unexpected input data); Check for hardware/ software faults (e.g., by examining runtime statistics) |
| Role of the Runtime Engine (RE) | RE uses generated checksum(s) on model parameters prior to running inferences | RE decrypts model parameters and requires proper key before allowing inferences; Detects watermarks | RE provides inference-time statistics |

FIG. 5

SYSTEM AND METHOD FOR SECURING A NEURAL NETWORK RUNTIME ENGINE

RELATED APPLICATIONS

This application claims priority under 35 U.S.C. § 119(e) to U.S. Provisional Application Ser. No. 63/400,195, which was filed on Aug. 23, 2022 and is hereby incorporated by reference.

BACKGROUND

This disclosure relates to the fields of artificial intelligence and cybersecurity. More particularly, embodiments disclosed herein provide for securing a neural network (NN) runtime or runtime engine against malicious attacks and piracy.

A neural network is a type of machine-learning model that mimics the operation of a human brain. It comprises a collection of interconnected software and/or hardware processing nodes that are similar to neurons in the brain. Nodes receive input data and use their logic to determine what value or other information, if any, to pass forward to other nodes. A NN may be trained with labeled training data that allows the processing nodes to learn how to recognize objects, classify or cluster data, identify patterns and/or an entity that differs from a pattern, etc.

Nodes are organized into layers, with those in one layer receiving their input data from a preceding layer and feeding their output to a subsequent layer. The greater the number of layers and the number of nodes within a layer, the more powerful the NN becomes, but the complexity increases commensurately. For example, the greater the number of nodes, the longer it takes to properly train a neural network.

However, as with any program or software construct, a neural network may be the target of a tampering attempt, possibly intended to affect how the network operates or to corrupt data (e.g., training data) that it processes. It may also be a target of piracy—an attempt to unlawfully use the NN. Traditionally, security of neural networks is lacking because NN operations are complex and differ from traditional software operations. Today's security solutions typically involve encrypting an entire application in which a NN is implemented or used. In addition, understanding and mitigating the entire attack surface for a deployed neural network runtime is cumbersome, time-consuming, and in most cases infeasible without additional security features embedded within the neural network runtime.

Neural networks operate differently than traditional software in that they operate in a statistical manner and, as such, standard software practices for securing a deployed software runtime are not sufficient. For example, neural networks may have different execution paths compared to a traditionally coded software, and they rely on stored configuration weights, which are trained on a training set. Deployed networks using these configuration weights access memory differently than standard software functions, which means that traditional means of protecting the code and data may be ineffective.

In addition to protecting their runtime environments and intellectual property, software developers also need appropriate security services for obfuscating and branding their work. Obfuscation hinders or prevents the reverse engineering of the work, while branding allows the work to be authenticated so that the provider's reputation will not be damaged in the event an inauthentic version of the work is passed off as genuine.

Therefore, what is needed is a system and method for integrating security into a neural network runtime in order to enhance the integrity of the runtime and provide protection against corruption, theft of intellectual property, and/or other malicious attacks.

SUMMARY

In some embodiments, systems and methods are provided for imbuing a neural network (NN) or other machine learning model with security attributes that improve the authenticity, availability, integrity, and/or confidentiality (AAIC) of the runtime. In particular, the AAIC attributes may help determine the health and/or performance of the runtime (i.e., availability), detect the provenance of the data and the model (i.e., authenticity), verify the consistency and trustworthiness of the runtime (i.e., integrity), and/or provide encryption and model obfuscation in the interest of determining ownership, preventing the loss of information, and authorizing use of the runtime (i.e., confidentiality).

In these embodiments, instead of applying security at the application level, the attributes function specifically to protect the machine learning model (e.g., a NN) and the runtime engine (or simply runtime) that executes to perform inferences as directed by the model. The attributes, which may illustratively include a watermark, encryption, and/or other constructs, are coupled with the model so that the resulting runtime is an integrated software object that contains the necessary interfaces without interfering with an encompassing application.

In different implementations, security attributes (or security elements deployed in support of the attributes) may be static, dynamic, or adaptive. A static security element does not change after deployment of a model, a dynamic element provides runtime responses that vary (e.g., based on input data), and an adaptive element provides different responses based on multiple factors (e.g., input to the model and operational context). In an illustrative implementation, an adaptive security service may emit a watermark over multiple inference results, and change the latency and/or accuracy of inferences to help prevent or resist reverse engineering of the model and training data.

In some embodiments, securing a neural network runtime engine involves obtaining source code for executing a NN model and a set of weights for supporting operation of the model, and training the model if/as needed. The model code and the weights are used to generate (e.g., via compilation) a first set of program code for performing inference operations as dictated by the model. Second program code is then generated for one or more security elements to provide runtime services during execution of the model. The first and second program code are then linked or otherwise integrated to form the neural network runtime engine.

DESCRIPTION OF THE FIGURES

FIG. 5 is a table describing how the AAIC attributes may be supported in a neural network runtime, in accordance with some embodiments.

DETAILED DESCRIPTION

Figure 1:
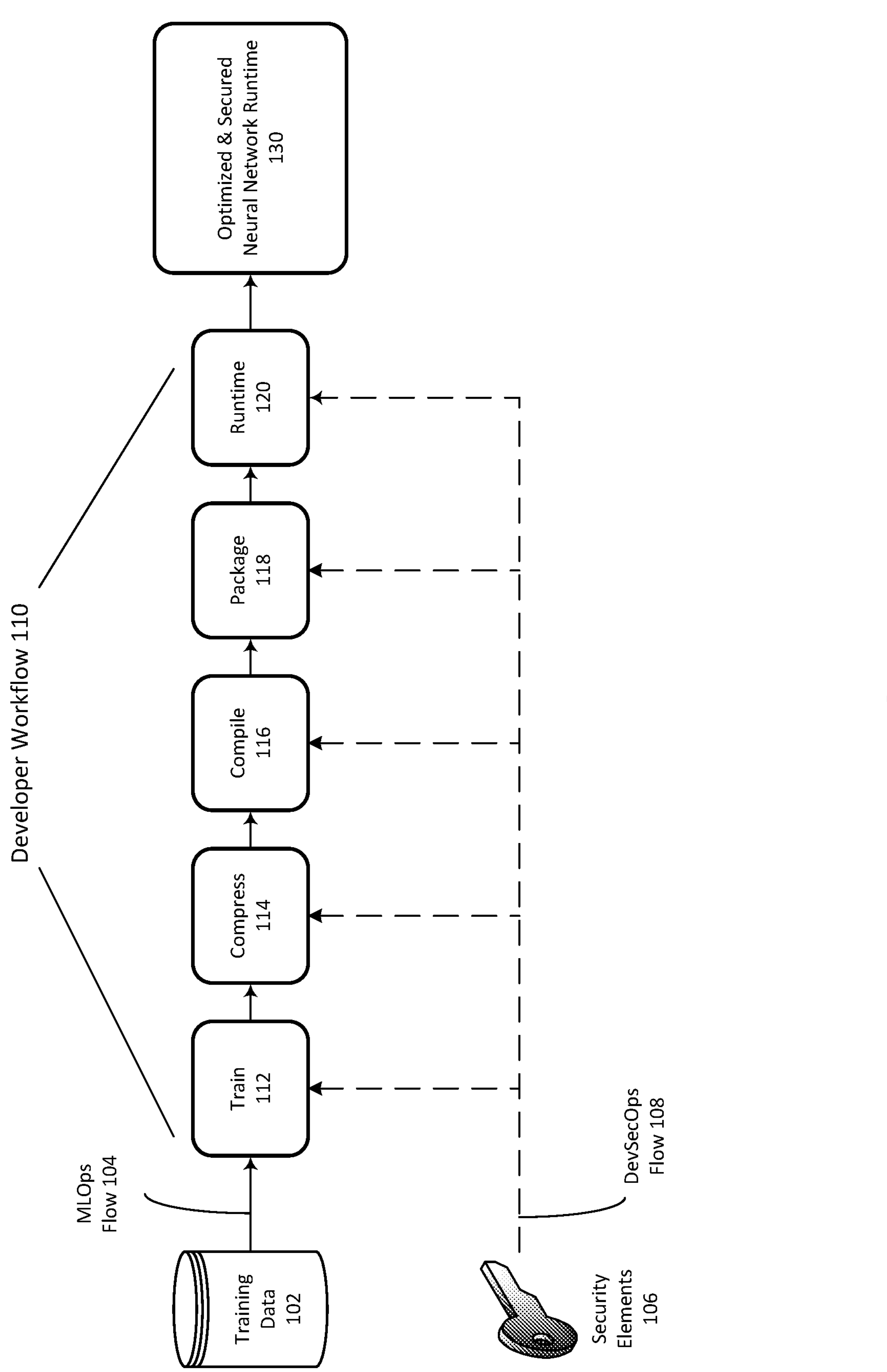
FIG. 1 is a block diagram depicting a developer workflow for generating an optimized and secured neural network runtime (or runtime engine), in accordance with some embodiments.

The following description is presented to enable any person skilled in the art to make and use the disclosed embodiments, and is provided in the context of one or more specific applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a neural network runtime is provided that has integrated security elements to increase the operational cyber effectiveness. A method for generating the runtime and/or a system for operating the runtime, which may also or alternatively be termed a runtime engine, are also provided.

The neural network runtime is generated using an end-to-end software development kit (SDK) that incorporates MLOps (machine learning operations) and DevSecOps (development, security, and operations) for neural network optimization and for security, respectively. Developers of artificial intelligence (AI) software need an end-to-end SDK to train, optimize and deploy/secure neural network runtimes all within the same workflow.

This is important because (a) a disparate and bespoke workflow can introduce supply chain cyber vulnerabilities, and (b) the neural network runtime can be more efficient and robust when optimization and security are well integrated. When deployed, the neural network runtime can be augmented with security measures that protect against reverse engineering. The runtime can also be instrumented to generate reports on the algorithmic and computation performance, for forensic evaluations by cyber analysts.

Currently, developers resort to encryption of an entire application in order to protect an AI model at the heart of the application. This approach of securing the entire application is far from optimal because (a) developers need to have intimate knowledge of the neural network runtime to secure all its attack surfaces, and (b) disparate, inconsistent support can arise across different applications that use the same model.

Attacks against neural network runtimes range in complexity, from a model inversion to recover a dataset to bit flips to alter a NN result to poison attacks that involve augmenting new training data to intentionally shift the model's algorithmic performance. One of the major limitations facing developers is the inability to share just the model or the model runtime. For example, developers would like to send their AI model for evaluation, but they worry about sharing the model because the model parameters expose their intellectual property (IP) and can be easily stolen.

Having their neural network secured directly would allow the developers to share their AI model (i.e., their intellectual property) for evaluation and/or other purposes. Similarly, companies deploy AI models, but it is very difficult to ascertain if their IP (model and runtime) have been stolen or pirated. In a similar scenario, given an AI-based application in the marketplace, it is also difficult to prove if the model and runtime belongs to the company. Having a watermark integrated with the model parameters would allow the company to check IP ownership.

The disclosed embodiments operate to support essential attributes of a neural network runtime, including Authenticity, Availability, Integrity, and Confidentiality (AAIC). Aspects of the disclosed embodiments include (a) a developer workflow for generating a model runtime with integrated security elements, (b) optimization algorithms (within the developer workflow) for selecting the best or most appropriate security elements for a current project, (c) a model runtime that can respond based on its integrated security elements, and (d) use cases that are enabled with a model runtime having integrated security elements. These aspects are discussed in the following sections, in the context of various embodiments.

Developer Workflow

FIG. 1 is a block diagram depicting a developer workflow for generating an optimized and secured neural network runtime, according to some embodiments. Specifically, FIG. 1 illustrates an integrated workflow for generating neural network runtimes (model runtimes) that are both optimized and secured. The model runtimes have integrated security elements to mitigate attacks by improving the AAIC security attributes. Within this workflow, a model can be trained, compressed, compiled, and packaged into a model runtime, with pruning, quantization, and/or other optimizations. Within this same workflow, security elements can be integrated into each of the workflow components to generate the runtime with integrated security elements.

Within MLOps (machine learning operations) flow 104, training data 102 (e.g., video and images that are labeled and annotated) feeds into train module 112, where one or more models or versions of a single model are trained on the training data. The training module outputs a trained model.

A trained model can be compressed in compress module 114 to reduce its memory storage size (e.g., via pruning and/or quantization), and then compiled in compile module 116 to generate a runtime that includes the machine code related to the compressed trained model. This runtime is then packaged in package module 118 to include appropriate runtime software services. The runtime with the software services can be transferred via runtime module 120 to target hardware for processing. Thus, optimized and secured neural network runtime 130 comprises the compressed and trained model, packaged and configured for operation on a specific hardware platform. NN runtime 130 will therefore differ from one hardware platform to another in order to execute most effectively and efficiently on the target platform.

DevSecOps (development, security, and operations) flow 108 imbues the entire workflow with security elements 106, as now described. First, within train module 112 of workflow 110, one or more tangible security elements (e.g., a watermark) are inserted into the training data. For example, a semi-transparent image, video or text snippet (e.g., company logo or name) that is fused into an image or video may be added to the training set. The set of training data that includes the security element is then labeled with a different label. During training, the AI model will learn to distinguish the watermark as a different object class. Further, the loss function can be modified such that (only) images with the watermark produce the desired output (e.g., an additional object class indicating detection of the watermark). In these embodiments, the watermark is converted into visual features that are learnt in the AI model, and the model parameters contain an encoding of the visual features. During model inference, the AI model will detect the watermark because it has been trained to do so, and a specific inference output can be produced based on the detection of the watermark as the input.

In other embodiments, a security element (e.g., watermark) is inserted into one or more model parameters during training. Although overwriting model parameter values generally negatively affects the accuracy of a model, in embodiments described herein a method is employed to force the model parameters to hold specific patterns of values that are based on the watermark. For example, if an inserted watermark has the value "1234", we can force the model to use only that value when selecting model parameter values during training. This means that the model can only use values associated with the watermark, and in a specified pattern in the watermark. This selection of the model parameter values can be done across the entire model, at a specific model layer, or even with finer grain at a selected part of a tensor within a model layer.

In yet other embodiments, model parameter values can be tuned during training to encode a specific pattern contained in the watermark. For example, model parameter values may be selected that have the least significant bits such that the "1234" pattern is observed. Similarly, this selection of the model parameter values can be done across the entire model, at a specific model layer, or even finer grain at a selected part of a tensor within a model layer. For example, we can select model parameter values to use "11-12-13-14", wherein the last digit of each sequential number follows the "1234" pattern, and the training loss function can be modified to enforce the use of values that follow the watermark pattern. The loss function can also contain a penalty function to guide the parameter values toward the watermark pattern. During training, the model parameters are trained using floating point values (e.g., higher bit precision), and the watermark pattern can be realized when the model parameters are quantized (e.g., in lower bit precision) for inference.

In summary, embodiments described with reference to FIG. 1 encompass the art of inserting security elements (e.g., watermarks) as patterns that can be observed during inference, with and without access to the model parameters. In a first embodiment, the watermark can be observed directly from the model inference output by providing a specific input to the model. In a second embodiment, given access to the model parameters, the watermark pattern can be observed.

Thus, within DevSecOps flow 108, train module 112 produces a model having parameters values learned from security-enhanced training data. The model can now be compressed, in compress module 114 (e.g., with pruning and/or quantization), to reduce the memory footprint of the model. The compression process may build upon the model parameters that were strategically selected during training, to encode the specific pattern contained in the security elements (e.g., a watermark). For example, the model parameter values may be compressed so that the least significant bits reveal a specified pattern (e.g., "1234"). Similar to the training process, this selection of the model parameter values can be done across the entire model, at a specific model layer, or with even finer grain at selected parts of a tensor within a model layer.

Subsequently, compile module 116 generates an optimized inference runtime (OIR) that contains all the machine code for model inference processing, including the model parameters, which may include the security elements inserted during training or compression. The OIR thus comprises optimized machine code, which operates faster and requires less power or fewer processor cycles than a basic neural network runtime.

Compile module 116 may add one or more security elements (e.g., watermarks) to the machine code it produces. For example, a numeric value x may be replaced with W*0+x, wherein W is a watermark value. In this example, watermark W is stored in the model's weights but, because of the multiplication by zero, the value x remains unchanged. As another example, compile module 116 may insert one or more additional parameters in the form of an additional tensor channel. In the latter example, the extra parameters comprise or form a security element (e.g., a watermark) that is not used in subsequent model inference operations. In yet another example, a hash function may be used as a key to traverse model weights to produce a watermark response.

Package module 118 generates the runtime engine (RE), which includes the OIR and associated services (RE Services) that it incorporates, and can be integrated within an optimized software application. The RE Services are added to the OIR using package module 118 to provide a standardized API (Application Programming Interface) for consistent access and operation. Further, the package module can access a software library (RE Service Library) for software functions that can be included in the RE Services. The package module also can encapsulate the RE Services around generated runtimes or pre-compiled runtimes, such that there is a standardized API for the optimized software application.

To the end software application, runtime engines (REs) appear to be software functions that provide inference processing. The runtimes operate by computing the mathematical formulas that perform the neural network inference. RE Services can be considered software microservices that are provided alongside the OIR and that can be integrated during the model building and development process. RE Services provide a consistent API for functions for a neural network, including, but not limited to, security.

Figure 2:
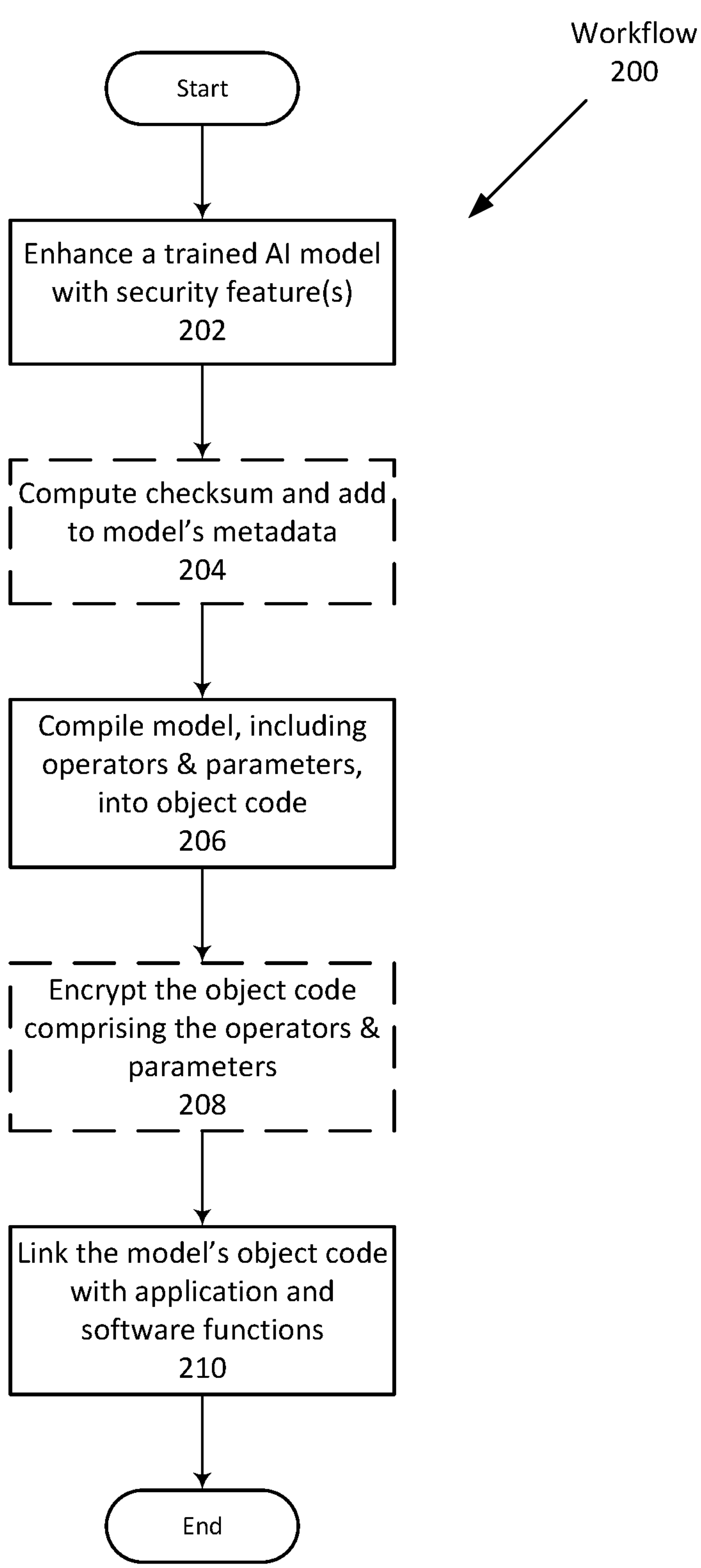
FIG. 2 is a flow chart illustrating a method of creating a secure neural network runtime engine, in accordance with some embodiments.

FIG. 2 is a flow chart illustrating a method of creating a secure neural network runtime, in accordance with some embodiments. In other embodiments, one or more of the identified operations may be omitted, repeated, and/or performed in a different order. Accordingly, the specific arrangement of steps of workflow 200 of FIG. 2 should not be construed as limiting the scope of any embodiment.

In operation 202, a neural network or other AI model is imbued with a security feature such as one or more watermarks, during or after training. For example, in some implementations, the model is trained as usual, but the watermark(s) are inserted into the trained model's parameters.

In optional operation 204, a cyclic redundancy check (CRC) code or other form of checksum is computed on the trained model and then inserted into the model's metadata.

In operation 206, the model is compiled into object code. In some embodiments, this involves mapping operators and parameters described in the model into hardware instructions.

In optional operation 208, if encryption is desired, the model's operators and/or parameters, which together form an optimized inference runtime, are encrypted in object code. RE Services that support the runtime may not be encrypted, but may be used later to decrypt the encrypted object code.

In operation 210, the object code of the trained model (i.e., the OIR, including the model's operators and parameters) is linked with the object code of a compiled software application for using the model, and is also linked with the (unencrypted) object code of compiled software functions from a RE Service Library.

The result of the method of FIG. 2 is a set of code that not only is executable as is, but that also secures the NN runtime within the application and provides the desired availability, authenticity, integrity, and confidentiality (AAIC) attributes. In particular, the design of the model is protected within an executable package that can be securely transmitted and linked to different sets of application software at different times, as desired.

In contrast, a traditional method for creating a NN runtime would compile the NN model early in the process, and link it with the target application source code. Only after this is done might a security feature be added to the entire package or container, which might then be encrypted. Thus, a very different type of entity is produced, namely a set of encrypted artifacts that cannot be directly executed, and the model cannot be employed with any other application software.

Optimization Algorithms

Optimization algorithms are used to select and insert desired security elements (e.g., watermarks) into AI model parameters and/or other parts of a model. As described above, in the training phase (e.g., operation 202 of workflow 200 of FIG. 2), a loss function may help optimize for model accuracy and watermark insertion. The numerical values for the model parameters and the watermark are unique patterns and can form two different signatures. Whereas model parameter values determine the accuracy of the trained model, watermark values determine the robustness of the security element (e.g., regarding detectability and/or resistance to tampering). These two different signatures do not often align in a way to have similar values or patterns, and the goal of an optimization algorithm is to find the best design that simultaneously meets goals for model accuracy and watermark robustness.

Model parameters are selected from a set of numerical values that can be represented as unique symbols. The watermark values can also be represented as unique symbols. The optimization algorithms therefore look for these common symbols, such that the model parameter and watermark values align to give the best accuracy and security robustness. Watermark values can be determined directly (from most significant bit to least significant bit), or they can be determined based on bit-planes across multiple model layers. An optimization algorithm would then determine the best way to map and interpret these symbols.

In some embodiments, a loss function applied during model training consists of at least two terms. The first term is used to determine the accuracy of the model, and is based on the model parameter values. The second term is used to determine the quality of the watermark. The quality of the watermark is determined, for example, by the length of the watermark and the number of unique symbols. It is desirable to select an exemplar watermark that has sufficient length and symbols. Usually, longer watermarks with more unique symbols make it harder to match the symbols or values for the model parameters.

In other embodiments, model training simultaneously optimizes on model accuracy and at least one of the following metrics related to security element robustness: lowering memory storage for model weights and one or more security elements, increasing the robustness of one or more security elements based on the number of bits used for the one or more security elements, decreasing the computational latency of the runtime services, decreasing the amount of memory access for the runtime services, and decreasing the amount of power used for the runtime services.

In yet other embodiments, watermark values are derived from a selected pattern among the model parameter values. That is, the watermark is generated from the model parameter values instead of being selected from a set of known watermarks. In a related example, the watermark can be determined from the histogram of model parameter values, which represents the distribution of values. In another related example, a lookup table is used to determine the indexing sequence into the model parameters to generate the unique watermark.

In yet other embodiments, watermark values are iteratively tuned using a generative adversarial model that generates inputs to train a model. The model may be trained in successive epochs consisting of interleaved training data (e.g., those that improve accuracy and those that improve watermark robustness). In one example, the quality of the watermark is determined by its persistence when the model parameter values are fine-tuned with additional training sequences.

After the training phase of a workflow, model parameter values are relatively fixed. Compression (e.g., pruning and/or quantization) may be used to alter the values but, in general, the overall distribution of values is already determined. In some embodiments, watermark values are derived from a selected pattern within the model parameter values of the trained model. In a related example, a watermark can be determined from the histogram of model parameter values, which represents the distribution of values. In another related example, a lookup table is used to determine the indexing sequence into the model parameters in the trained model to generate the unique watermark. In yet other embodiments, the bit-precision of each model layer may be selected in the compression module such that the quality of the watermark (e.g., regarding detectability and/or resistance to tampering) is improved.

Model Runtime Response

As indicated above, the optimized inference runtime (OIR) provides basic functionality for running an NN model's inference computations, to include convolutions, activations, and/or other mathematical functions. RE Services that may be compiled or linked with the OIR include the following key functions: Operate, Orchestrate, Secure, Interact, and Diagnose.

RE Services (Operate) includes operational functions such as, but not limited to, loading and/or unloading values to and from memory (e.g., set input(s), get output(s)), user-defined functions for pre- and/or post-processing (e.g., input resizing and/or rescaling), and running neural network inferences.

RE Services (Orchestrate) includes operational functions common to multiple runtimes, including, but not limited to, receiving input from a remote location, sending output to a remote location, and continual learning functions (such as setting or retrieving a confidence score threshold) to determine whether input data should be saved for later training, and identifying memory locations to store the input data.

RE Services (Secure) includes functions for validating model authenticity and/or authorization, such as checking the model's integrity, decrypting and authenticating a watermark embedded in the model, and validating authorization to enable operation of the runtime engine.

RE Services (Interact) includes functions for gathering model information, including, but not limited to, collecting status and/or characteristics of the model (e.g., a unique ID (or UUID), the health of the RE, model metadata), collecting performance metrics (e.g., statistics concerning memory usage, latency, accuracy), and obtaining diagnostic information related to debugging and/or profiling operation of the RE.

RE Services (Diagnose) includes functions related to the handling of error conditions, such as retrieving pointers to interrupt handlers and/or error/timeout codes for application software for diagnosing error conditions.

Figure 3:
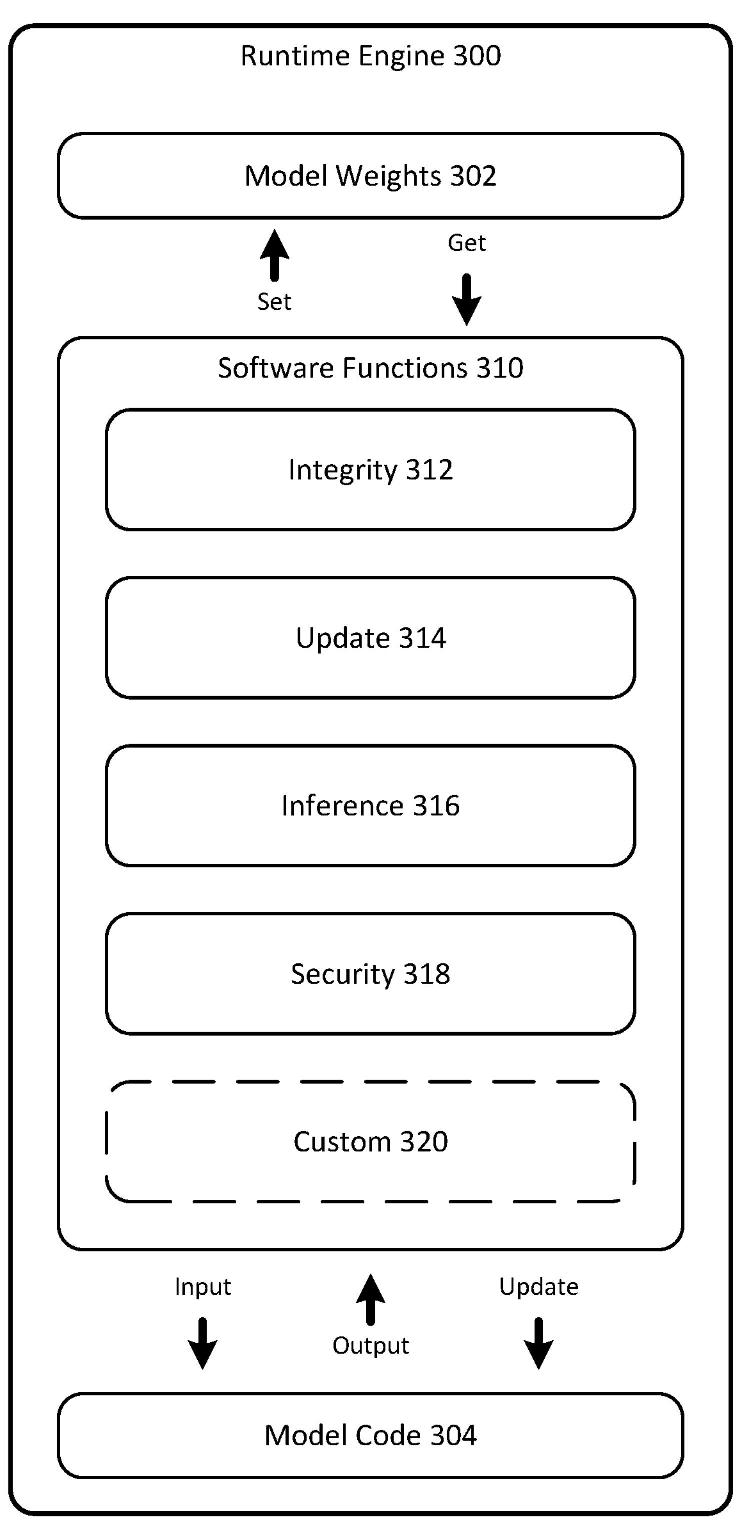
FIG. 3 depicts the software architecture of a runtime engine (RE), in accordance with some embodiments.

FIG. 3 depicts the software architecture of a runtime engine (RE), according to some embodiments. In these embodiments, model code 304 (including operators) and weights 302 (including parameters) of runtime engine software 300 together comprise an optimized inference runtime (OIR) as discussed above, but are separated to enable focused upgrades (e.g., the model weights can be updated without modifying the application code containing the RE). Software functions 310 are RE Services (e.g., Operate, Orchestrate, Secure, Interact, Diagnose) derived from a RE Services library and packaged with the model after compilation of the model. Software functions 310 may be only a subset of the RE Services that could augment a NN runtime.

In some implementations, integrity function 312 operates as part of RE Services (Secure) to perform a CRC checksum on the model weights to determine if there have been any changes (e.g., bit flips or inversion), and may output an identifier of the source of model weights 302. Update function 314 operates as part of RE Services (Orchestrate) to update the set of model weights, and inference function 316 is part of RE Services (Operate) and performs neural network inferences. Security function 318 operates as part of RE Services (Secure) to provide security for the runtime engine.

In some embodiments, during execution of the runtime engine, input to the RE is randomly augmented by security function 318, using selected security elements, to mitigate a cyberattack. This augmentation may be enabled by compile module 116 of developer workflow 110 of FIG. 1. In some implementations, the augmentation includes filtering the input data, and may be dependent on the current context (e.g., whether there is a current warning indicating a possible cyberattack). Augmentation of the input data, in a random or adaptive manner, makes it difficult for an adversary to observe the behavior of the RE because the RE no longer operates in a predictable manner.

In some other embodiments, during execution of the runtime engine, security function 318 may set a context (e.g., a warning indicating a possible cyberattack), and update function 314 may respond by replacing model weights 302 and/or model code 304. The ability to replace the model weights and/or the model code during execution of the NN runtime makes it difficult for an adversary to perform bit-flip or inversion attacks, because the RE is adaptively mitigating those attacks. In a bit-flip attack, a malicious actor changes bits in the NN model to alter operation of the neural network. In an inversion attack, an actor maliciously attempts to recover a private dataset used by the NN.

Optional custom function 320 represents one or more application-specific functions that can be included in the RE Services library and that can be packaged with the model after compilation, for integration into the RE. In some embodiments, custom function 320 forms part of RE Services (Secure), and handles decryption of the model weights, which may be stored in memory as encrypted values. In other embodiments, the custom function is part of RE Services (Interact), where monitoring of model metrics is performed in a standard manner. For example, the AI model can be checked for out-of-distribution (OOD) anomalies (e.g., during poison attacks) if the values in the inference processing have encountered an out-of-range result. Upon detection of a cyberthreat, RE Services (Update) can update the model code and the set of model weights. The model code and/or weights can also be updated to make reverse-engineering difficult for an attacker. Similarly, model code and weight changes make it difficult for inversion attacks to recover the private dataset used to train a neural network.

Software Functions 310 are codified in standard software languages (e.g., C, C++, Python), with fine-grained access to the model graph and weights at the tensor level, through the developer workflow, described earlier. The software functions are integrated with the model code into a software object that can be linked into applications.

Figure 4A:
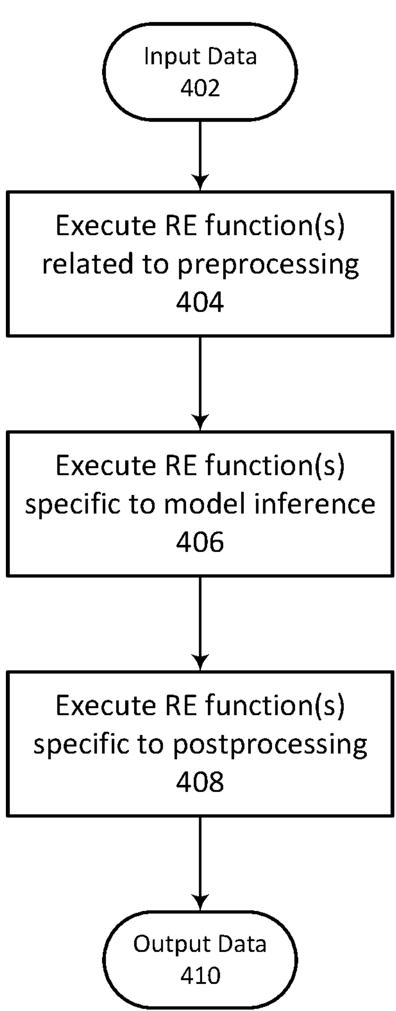
FIGS. 4A-4C illustrate workflows for some RE Services, in accordance with some embodiments.
Figure 4B:
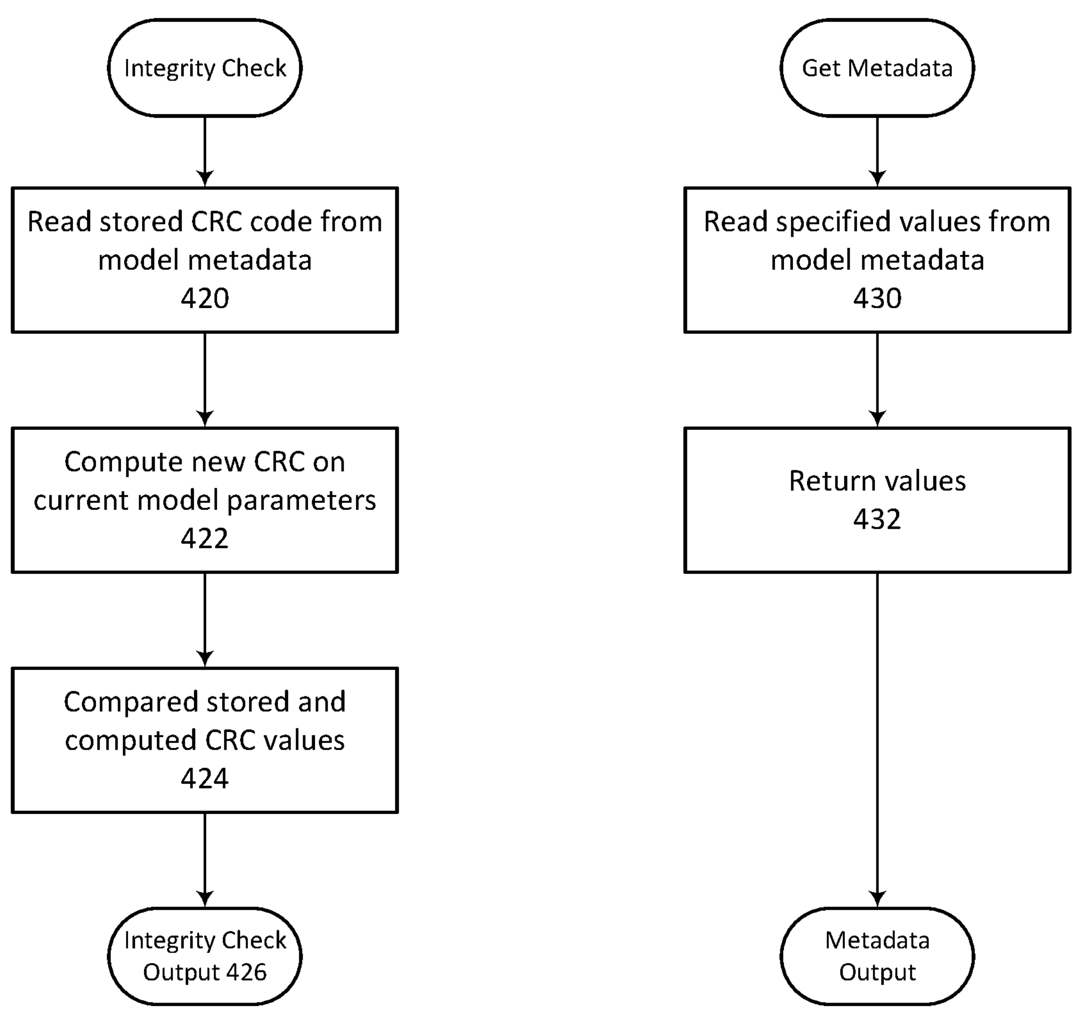
Figure 4C:
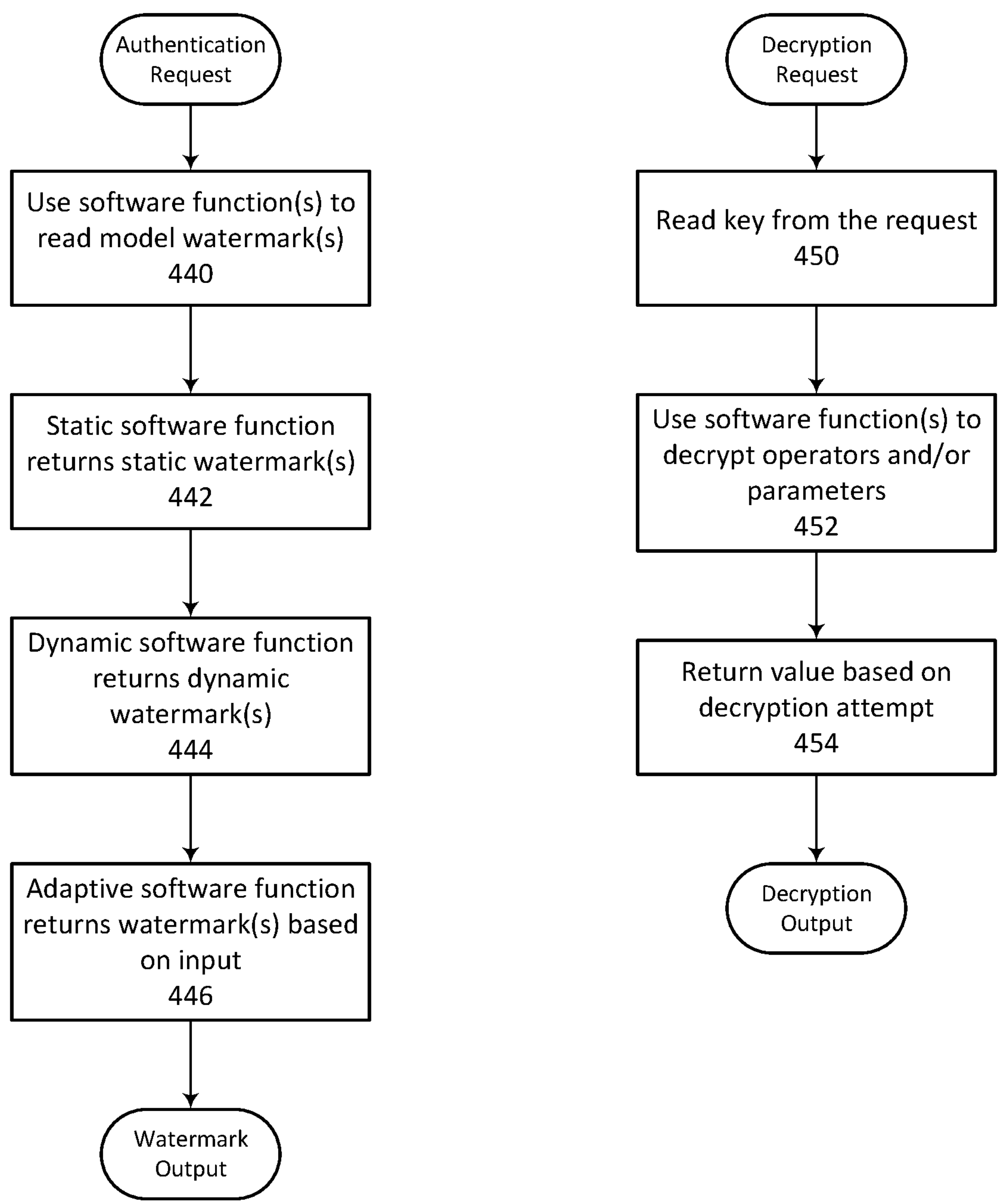

FIGS. 4A-4C illustrate workflows for some RE Services in support of a single neural network runtime, according to some embodiments. Because only a single runtime is involved, RE Services (Orchestrate) is not involved. In addition, the workflows do not involve any diagnosis or troubleshooting, and so RE Services (Diagnose) is also omitted. Thus, the workflows demonstrate cooperation among RE Services (Operate, Interact, and Secure). Due to the robust and flexible construction of the runtime engine (e.g., as shown in FIG. 3), the RE Services can provide model inference functions while concurrently providing other services that are uniquely integrated with the model.

In the workflow of FIG. 4A, RE Services (Operate) receives input data from application software in operation 402. Next, model code 304 is executed in operation 404 to prepare the input data for processing. In operation 406, RE Services (Operate) executes one or more functions within model code 304 that are specific to model inference (i.e., to perform specified NN inference processing) and, in operation 408, executes a function in model code 304 related to postprocessing to prepare the output of the NN inference processing. In operation 410, the output data is produced.

In an illustrative implementation of the workflow of FIG. 4A with runtime engine 300 of FIG. 3, application code containing runtime engine 300 may execute RE Services (Operate) (e.g., inference module 316), which selects the model code 304 to first prepare the input data from the application (e.g., to resize image resolution), run NN inferences (e.g., mathematical operations) on the input data, and then prepare the output (e.g., by converting the numeric inference output to a text-string related to an object detected in the input image) to return to the application software.

In the workflow of FIG. 4B, RE Services (Interact) (e.g., integrity function 312 of FIG. 3) may simultaneously or asynchronously perform two subflows—one dealing with an integrity check and one dealing with model metadata. Advantageously, this provides for an examination of the health/validity of the model and a determination regarding whether the model has been tampered with to proceed in parallel. In operation 420, an integrity check begins with reading a stored CRC code or checksum value from model metadata. In operation 422, a fresh CRC value is computed on current model parameters and, in operation 424, the stored and computed CRC values are compared. In operation 426, the results of the comparison are used to produce an output of the integrity check (e.g., pass or fail). Meanwhile, in operation 430, within the metadata subflow, RE Services (Interact) reads values from the model's metadata (e.g., serial number, UUID, version) and in operation 432, the values are output as necessary to the application software that incorporates the Runtime Engine.

In the workflow of FIG. 4C, RE Services (Secure) (e.g., security function 318 of FIG. 3) also handles two subflows—one dealing with an authentication request and one dealing with a decryption request. Within the authentication subflow, in response to the authentication request, RE Services (Secure) reads one or more watermarks from the model using the appropriate software function (shown in FIG. 3) in operation 440. In operation 442, if a static software function is invoked, a static watermark is obtained. In operation 444, if a dynamic software function is invoked, a dynamic watermark is obtained that is based on input data. In operation 446, if an adaptive software function is invoked, contextual input is ingested and the input data and contextual input are used together to select and return one or more corresponding watermarks. Any or all of operations 442-446 may be invoked, depending on the authentication request, the input, and the type(s) of watermarks embedded in the model. Static, dynamic, and adaptive watermarks are described in detail below.

Meanwhile, in operation 450 of the decryption subflow, RE Services (Secure) (e.g., security function 318 of runtime engine 300 of FIG. 3) receives a decryption request and extracts a key (e.g., a private key in a private key exchange (PKE) scheme) from the request. In operation 452, using the key and the appropriate software function of the RE (e.g., the custom function shown in FIG. 3), operators and/or parameters of the model are decrypted from within the runtime object code, and are stored in memory. In operation 454, a result or value corresponding to the decryption request (e.g., pass or fail, a decrypted value) is returned or output.

Use Cases

As described above, the runtime services, particularly RE Services (Secure), which may be implemented as security function 318 of runtime engine 300 of FIG. 3, provide support for the AAIC security attributes within a neural network runtime. FIG. 5 demonstrates how the attributes may be supported, and provides several associated use cases. In the table, the authenticity and integrity attributes are combined (authenticity/integrity 502) due to the close nature of their cooperation. The attributes of confidentiality 504 and availability 506 are addressed individually. For each attribute, FIG. 5 provides a description and indicates how the runtime services function in its regard, identifies objectives, provides example use cases, and describes the role of the runtime engine.

As previously discussed, there are many different combinations of security elements that can be integrated into the RE as part of RE Services (Secure). In some embodiments, a digital watermark comprising a marker or code sequence is embedded within the model weights, and may be used to verify the authenticity or integrity of the weights. For example, a watermark can be used to show the identity of the owner of the model, and/or to show the origin of the model creation (i.e., source tracking). Strong watermark codes can maintain their integrity even if the model is fine-tuned with transfer learning or quantization. In other embodiments, the model weights are encrypted for storage on disk using an encryption key set by the developer in the developer workflow. Once deployed, the RE Services (Secure) can decrypt the model weights, using the key set, so that inference processing can proceed.

Tight coupling of security elements provides robust benefits to the resulting neural network runtime. For example, the neural network parameters can be quantized from floating point representation to integer representations without losing algorithmic accuracy. The memory savings can then be used to insert watermark signatures to the model parameters without increasing model storage. Furthermore, the neural network runtime can be compiled to return watermark signatures statically or dynamically over multiple inferences.

The RE can also be used to check the watermark(s) embedded in the model (not just in the model weights). Thus, with reference to FIG. 1, compression of the AI model by compress module 114 may be quantized to a low bit-precision level for the model parameters. And, package module 118 can insert a watermark signature within the model parameters in a way that does not affect the operational performance of the model. For example, if the compressed model is quantized to 7-bit precision, then the package module can insert one bit of watermark signature across each model parameter. For a model with 1 million parameters, the watermark signature can store up to 1 million bits. The watermark signature can also be selected based on latency for authenticating the watermark in the target hardware.

Security elements implemented in embodiments discussed herein, including (but not limited to) watermarks and encryption, may have static, dynamic, or adaptive qualities. In these embodiments, watermarks are inserted into a model graph and/or weights during training and/or during optimization of the model. A static watermark is usually the only watermark code added to a model and, when requested after the model is deployed, is produced in the same form. In contrast, multiple dynamic watermarks may be embedded in a single model and, when the runtime engine receives as request for a watermark, it responds differently (i.e., with a different watermark) depending on the input to the neural network runtime. For example, when the input consists of images of cats, a different watermark code is returned than when the input consists of images of dogs.

Adaptive watermarks take this one step further, such that, upon receipt of a watermark request, the watermark produced by the runtime engine in response is based not only upon the input, but also upon additional context, such as previous input and/or a system input (e.g., a warning indicating a possible cyberattack). The runtime engine's response can also change the latency and accuracy of the inferences, perhaps to add additional latency to responses with inference results that fluctuate in accuracy within a small threshold (e.g., add 5 ms latency with a 1% accuracy loss).

Another type of security element, the use of encryption, may be applied to model weights during model deployment. The weights are then decrypted during execution of the runtime. To make reverse engineering difficult, the model weights may be decrypted to alternative bit-precisions. For example, if the intended model weights are in 16-bit precision, the decryption process may decrypt the model weights in 8-bit precision. This can help frustrate an attempt to reverse engineer the runtime because the decrypted values are different from the original values. Furthermore, the model code might be decoded to include decoy operators (e.g., essentially NOPs—no operations) that change the computational latency of the NN inference.

An adaptive encryption/decryption scheme builds upon the dynamic arrangement with additional contextual input. The contextual input can consist of (a) the operational state of the RE and machine learning system, (b) a history of RE inputs and outputs, and/or (c) outputs of other cyber physical systems, such as a malware detector that indicates the detection of a virus. The contextual input essentially amounts to temporal analytics for adapting operation of the RE. Other possible behaviors include random augmentation of inputs (e.g., skew/flip) to mitigate inversion attacks.

Several security elements have been introduced, but there are yet more that may be integrated into a runtime engine or RE. For example, one or more of several obfuscation techniques can be applied. With 'tensor renaming,' some or all tensor names may be renamed to include binary and/or other non-ASCII characters. 'Packing' may be performed by padding a tensor to make it difficult to determine its type. By way of example, bias values are typically relatively small and single dimension, but could be enlarged to resist reverse engineering. 'Confusion' involves adding graph nodes to act as confusing entities. With a 'transformation' scheme, common instructions are transformed and/or swapped for more complex and less common instructions that effectively produce the same result. 'Paring' may be applied to remove unused code and metadata to reduce the amount of information that could be used to reverse engineer the model. Also, additional program code could be added to the model to make it harder to read or analyze, without affecting runtime logic and results.

As with watermarks and encryption/decryption regimes, dynamic or adaptive characteristics can be added to these obfuscation techniques by adjusting how the code and model weights are encrypted. For example, decrypting additional unused metadata and code makes it more difficult to ascertain the model parameters and runtime. Also, however, increasing the robustness levels typically increases the processing workload, so it is advantageous from a performance perspective to lower the level of obfuscation when it is not needed.

In some embodiments, the validity and integrity of an AI model are demonstrated or proven using security elements described herein. In these embodiments, during inspection of the model, the application software may request a CRC check to check the integrity of the RE to make sure the model parameters and graphs have not been tampered with. The application software can also read the specific watermark security elements to verify the validity of the AI model in the RE. In these embodiments, therefore, the developer of the AI model can ensure the provenance of the model with the insertion of the security elements. A customer interested in purchasing the RE may request access to these security elements to ensure the integrity and validity of the model before purchasing. Further, a seller or marketplace owner may also access the security elements to ensure the integrity and validity of the model before selling. The RE runtime can include encryption of the AI model to make sure it is secure when the seller transmits the model to the buyer.

Also, an AI model developer that suspects that an RE model has been stolen can access the watermark security element to see if the model is a clone or is derivative of its original model. In this example, the watermark may have dynamic or adaptive security characteristics, wherein the watermark information is transmitted over multiple inferences.

In other embodiments, a watermark security element that is trained to identify objects in camera images is integrated into the RE. In these embodiments, a camera or camera sensor generates images to be used as inputs to the RE, and the RE generates inferences on detected objects in the scene. A specific watermark image can be used as input to the RE, such that the RE generates watermarks as the output. For static cases, the RE will respond with the same watermark output. For dynamic cases, the RE will respond with changing watermark outputs (e.g., depending on the input). For adaptive cases, the RE will respond differently based on a current context. For example, if an adversarial attack is detected, the RE may embed watermark output over multiple inference outputs.

In yet other embodiments, a watermark security element is integrated into an RE trained to generate synthetic images. Using adaptive security characteristics, for example, the RE may generate synthetic images as inference results, wherein the watermark is detectable by specific users. In this way, the images generated by the RE (with watermark(s)), can be easily determined as synthetic. In a second example, hardware tokens (e.g., generated by random number generators, physical unclonable functions, or analog circuitry with unique values) can be used by the RE to set the adaptive security characteristics. The RE-generated inferences will contain watermark signature to indicate that the results are not synthetic. For inferences that generate images as output, the watermark can be encoded into pixel values. For inferences that generate text, the watermark can be encoded in the pattern of text, distribution of characters or words, selection of words or characters, etc. In these examples, a user can determine if content and media are synthetically generated by AI, and whether the content and media are physically captured and processed on hardware. The security watermark is used to validate the data in which the RE is processed.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of securing a neural network (NN) runtime engine, the method comprising:

obtaining a NN model and a set of weights for the NN model;

generating first program code to perform inference operations based on the NN model and the set of weights, wherein generating the first program code comprises:

configuring the inference operations to proceed with at least one of adaptive latency or adaptive accuracy;

wherein adaptive latency dynamically modifies latency of the inference operations during execution of the NN runtime engine in response to input to the NN runtime; and wherein adaptive accuracy dynamically modifies accuracy of the inference operations during execution of the NN runtime engine in response to input to the NN runtime engine wherein the at least one of adaptive latency or adaptive accuracy comprise:

processing decoy operators to resist reverse engineering of model performance and accuracy;

generating second program code to provide runtime services comprising one or more security elements to secure the NN model;

integrating the first program code and the second program code into the NN runtime engine; and training the NN model with the use of a loss function comprising a first term for determining an accuracy of the NN model and second term for determining a quality and a robustness of a digital watermark embedded in the NN model, wherein the one or more digital watermarks are tuned during training of the NN model for the quality and the robustness of the digital watermark embedded in the NN model, wherein the quality of the digital watermark of the NN model is based upon the length of the digital watermark and the number of unique symbols of the digital watermark and the robustness of the digital watermark of the NN model is based upon a number of bits used for the digital watermark.

2. The method of claim 1, wherein the one or more security elements include at least one of:

a checksum;

a watermark; and encryption.

3. The method of claim 1, wherein the one or more security elements include a digital watermark derived from a pattern discernable within parameters of the NN model.

4. The method of claim 1, further comprising applying different bit-precisions in different layers of the NN model to improve a quality of a digital watermark included in the one or more security elements.

5. The method of claim 1, wherein generating the second program code comprises:

encrypting one of or both the model and the set of weights.

6. The method of claim 1, wherein generating the second program code comprises:

storing the set of weights in the NN runtime engine in a storage location addressable by one or more security elements.

7. The method of claim 1, wherein generating the second program code comprises:

storing the set of weights in the NN runtime engine with padded values and with stored values addressable by one or more security elements.

8. The method of claim 1, further comprising:

executing the NN runtime engine; and providing adaptive responses based on input to the executing NN runtime.

9. The method of claim 1, further comprising:

identifying a bit-precision of the obtained model and set of weights; and inserting one or more watermarks to occupy unused bits of the obtained model and the set of weights.

10. The method of claim 1, further comprising:

during execution of the NN runtime engine, outputting an identifier of a source of the set of weights.

11. The method of claim 1, further comprising:

during execution of the NN runtime engine, detecting an inversion of one or more bits in the set of weight.

12. The method of claim 1, further comprising:

during execution of the NN runtime engine, randomly augmenting the input to the NN to mitigate a cyberattack.

13. The method of claim 1, further comprising:

during execution of the NN runtime engine, replacing the set of weights in the NN runtime engine.

14. The method of claim 1, wherein obtaining the NN model comprises training the NN model to do at least one of the following:

lower memory storage for the model;

increase robustness of the one or more security elements;

decrease computational latency associated with the one or more security elements;

decrease an amount of memory accessed by the one or more security elements; and decrease an amount of power used to execute the one or more security elements.

15. A non-transitory computer-readable medium storing instructions that, when executed by a processor, cause the processor to perform a method of securing a neural network (NN) runtime engine, the method comprising:

obtaining a NN model and a set of weights for the NN model;

generating first program code to perform inference operations, wherein generating the first program code comprises:

configuring the inference operations to proceed with at least one of adaptive latency or adaptive accuracy;

wherein adaptive latency dynamically modifies latency of the inference operations during execution of the NN runtime engine in response to input to the NN runtime; and wherein adaptive accuracy dynamically modifies accuracy of the inference operations during execution of the NN runtime engine in response to input to the NN runtime engine wherein the at least one of adaptive latency or adaptive accuracy comprise:

processing decoy operators to resist reverse engineering of model performance and accuracy;

generating second program code to provide runtime services comprising one or more security elements to secure the NN model;

integrating the first program code and the second program code into the NN runtime engine; and training the NN model with the use of a loss function comprising a first term for determining an accuracy of the NN model and second term for determining a quality and a robustness of a digital watermark embedded in the NN model, wherein the one or more digital watermarks are tuned during training of the NN model for the quality and the robustness of the digital watermark embedded in the NN model, wherein the quality of the digital watermark of the NN model is based upon the length of the digital watermark and the number of unique symbols of the digital watermark and the robustness of the digital watermark of the NN model is based upon a number of bits used for the digital watermark.

16. A system for securing a neural network (NN) runtime engine, comprising:

at least one processor; and memory storing instructions that, when executed by the at least one processor, cause the system to:

obtain a NN model and a set of weights for the NN model;

generate first program code to perform inference operations, wherein generating the first program code comprises:

configuring the inference operations to proceed with at least one of adaptive latency or adaptive accuracy;

wherein adaptive latency dynamically modifies latency of the inference operations during execution of the NN runtime engine in response to input to the NN runtime; and wherein adaptive accuracy dynamically modifies accuracy of the inference operations during execution of the NN runtime engine in response to input to the NN runtime engine wherein the at least one of adaptive latency or adaptive accuracy comprise:

processing decoy operators to resist reverse engineering of model performance and accuracy;

generate second program code to provide runtime services comprising one or more security elements to secure the NN model;

integrate the first program code and the second program code into the NN runtime engine; and train the NN model with the use of a loss function comprising a first term for determining an accuracy of the NN model and second term for determining a quality and a robustness of a digital watermark embedded in the NN model, wherein the one or more digital watermarks are tuned during training of the NN model for the quality and the robustness of the digital watermark embedded in the NN model, wherein the quality of the digital watermark of the NN model is based upon the length of the digital watermark and the number of unique symbols of the digital watermark and the robustness of the digital watermark of the NN model is based upon a number of bits used for the digital watermark.

* * * * *